United States Patent
Nakase et al.

(10) Patent No.: US 7,750,973 B2
(45) Date of Patent: Jul. 6, 2010

(54) IMAGE PICKUP APPARATUS WITH FRAME RATE CONVERSION INFORMATION OUTPUT

(75) Inventors: Hiromi Nakase, Osaka (JP); Shinji Takemoto, Katano (JP); Yukio Shimamura, Hirakata (JP); Akiyuki Noda, Shijonawate (JP); Katsuyuki Taguchi, Hirakata (JP)

(73) Assignee: Panasonic Corporation, Osaka (JP)

( * ) Notice: Subject to any disclaimer, the term of this patent is extended or adjusted under 35 U.S.C. 154(b) by 1279 days.

(21) Appl. No.: 10/485,203

(22) PCT Filed: Nov. 11, 2002

(86) PCT No.: PCT/JP02/11723

§ 371 (c)(1), (2), (4) Date: Jan. 29, 2004

(87) PCT Pub. No.: WO03/043314

PCT Pub. Date: May 22, 2003

(65) Prior Publication Data

US 2004/0212690 A1 Oct. 28, 2004

(30) Foreign Application Priority Data

Nov. 12, 2001 (JP) ............... 2001-345822
Nov. 13, 2001 (JP) ............... 2001-347189

(51) Int. Cl.
  *H04N 7/01* (2006.01)
  *H04N 11/20* (2006.01)
  *H04N 5/91* (2006.01)
  *G06F 3/00* (2006.01)

(52) U.S. Cl. .......... 348/441; 348/443; 348/231.5; 348/459; 386/131; 715/723

(58) Field of Classification Search .......... 348/231.5, 348/441–443, 222.1, 439.1, 459; 386/131, 386/117; 715/723
See application file for complete search history.

(56) References Cited

U.S. PATENT DOCUMENTS 4,611,225 A * 9/1986 Powers ............... 348/443
5,191,427 A * 3/1993 Richards et al. ........ 348/97

(Continued)

FOREIGN PATENT DOCUMENTS

EP 0 473 322 A1 3/1992

(Continued)

OTHER PUBLICATIONS

Japanese Office Action Issued in corresponding Japanese Patent Application No. JP 2001-345822, dated Nov. 7, 2006.

(Continued)

*Primary Examiner*—Lin Ye
*Assistant Examiner*—Chia-Wei A Chen
(74) *Attorney, Agent, or Firm*—McDermott Will & Emery LLP

(57) ABSTRACT

A pickup 1 generates a video signal based on an arbitrarily set frame rate. A frame rate converter 2 converts a frame rate of the video signal output from the pickup 1 into a predetermined frame rate. Frame rate conversion information output units 6 and 4 output information on frame rate conversion in a manner corresponding to a video signal after the frame rate conversion.

4 Claims, 11 Drawing Sheets

U.S. PATENT DOCUMENTS

| | | | | |
|---|---|---|---|---|
| 5,317,456 | A | * | 5/1994 | Sugiyama ............... 386/93 |
| 5,568,275 | A | * | 10/1996 | Norton et al. ............ 386/52 |
| 5,640,202 | A | * | 6/1997 | Kondo et al. .......... 348/222.1 |
| 5,671,008 | A | * | 9/1997 | Linn ..................... 348/97 |
| 5,999,406 | A | | 12/1999 | McKain et al. |
| 6,111,610 | A | * | 8/2000 | Faroudja ................ 348/441 |
| 6,243,139 | B1 | | 6/2001 | Takahashi et al. |
| 6,400,895 | B1 | * | 6/2002 | Webb et al. ............ 386/131 |
| 6,469,744 | B1 | * | 10/2002 | Pearlstein .............. 348/554 |
| 6,549,240 | B1 | * | 4/2003 | Reitmeier .............. 348/459 |
| 6,671,323 | B1 | * | 12/2003 | Tahara et al. ......... 375/240.26 |
| 6,871,003 | B1 | * | 3/2005 | Phillips et al. ............ 386/55 |
| 2004/0081437 | A1 | * | 4/2004 | Asada et al. ............ 386/131 |

FOREIGN PATENT DOCUMENTS

| | | |
|---|---|---|
| EP | 811292 A | 12/1997 |
| JP | 7-95441 A | 4/1995 |
| JP | 7-298112 | 11/1995 |
| JP | 11-177868 A | 7/1999 |
| JP | 11-508095 A | 7/1999 |
| WO | WO 98/26600 A1 | 8/1996 |
| WO | WO 01/75885 | 10/2001 |

OTHER PUBLICATIONS

European Search Report, issued in European Patent Application No. 02803102.9-1241, dated on Feb. 12, 2008.

SMS Productions: "Panasonic New AJ-HDC27V HD Cinema Camera Chronicles the Plight of 'Norman J. Lloyd'", Internet Article, Jun. 30, 2001, Retrieved from: http://www.smsprod.com/hdcinema/press3.html.

Wiswell, "Panasonic's variable-frame-rate camcorder" Broadcast Engineering, [online], Dec. 1, 2001, Retrieved from http://broadcastengineering.com/mag/broadcasting_panasonics_variableframerate_camcorder/.

Wiswell, "Utilizing Overcrank/Undercrank Video from the Panasonic Variable Frame Rate High Definition Camera", Internet Article [online], Nov. 27, 2007, retrieved from ftp;//ftp.panasonic.com/pub/Panasonic/drivers/pbts/papers/overcrank-WP.pdf.

* cited by examiner

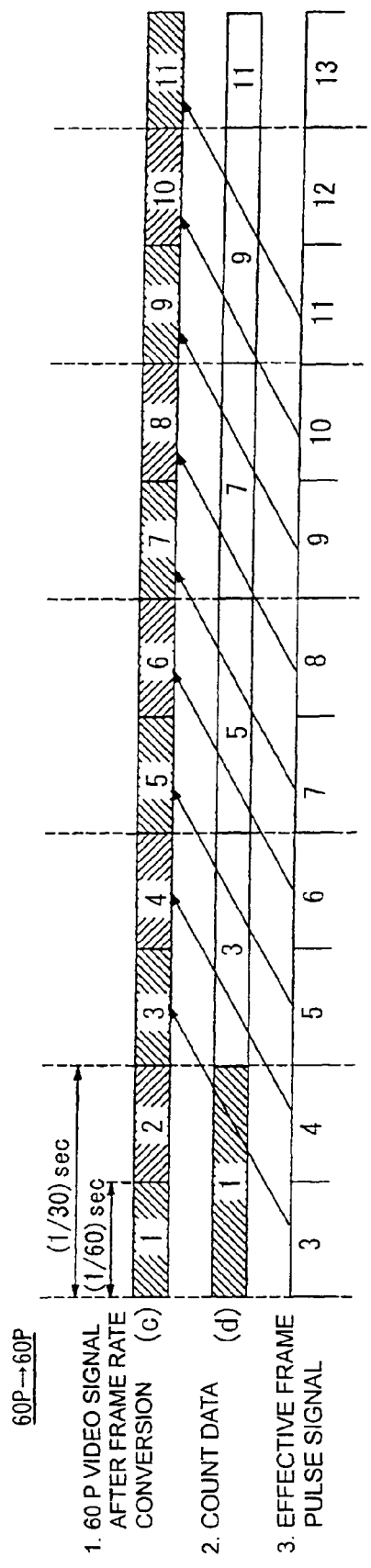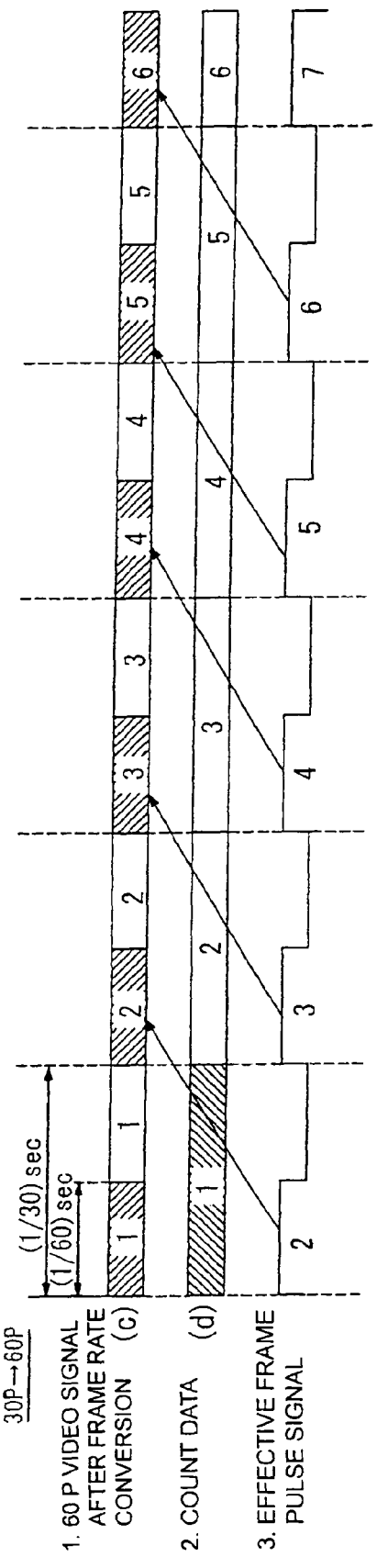

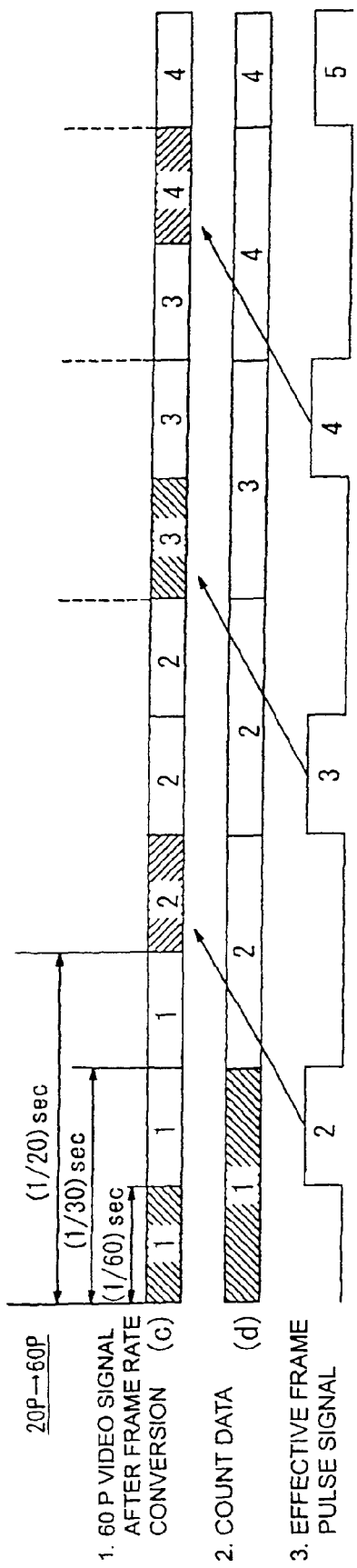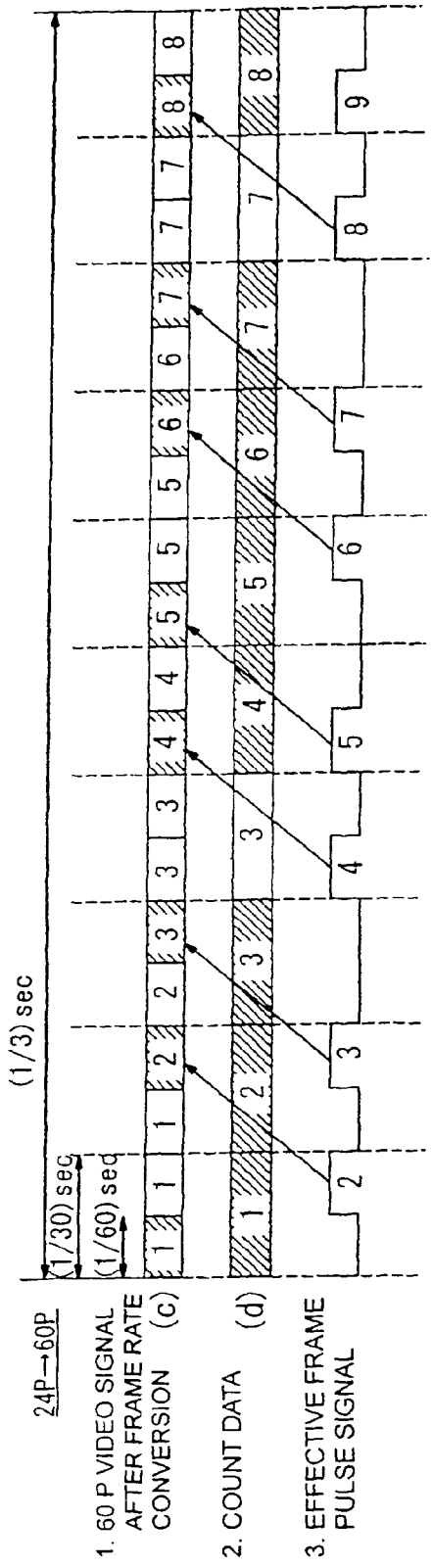

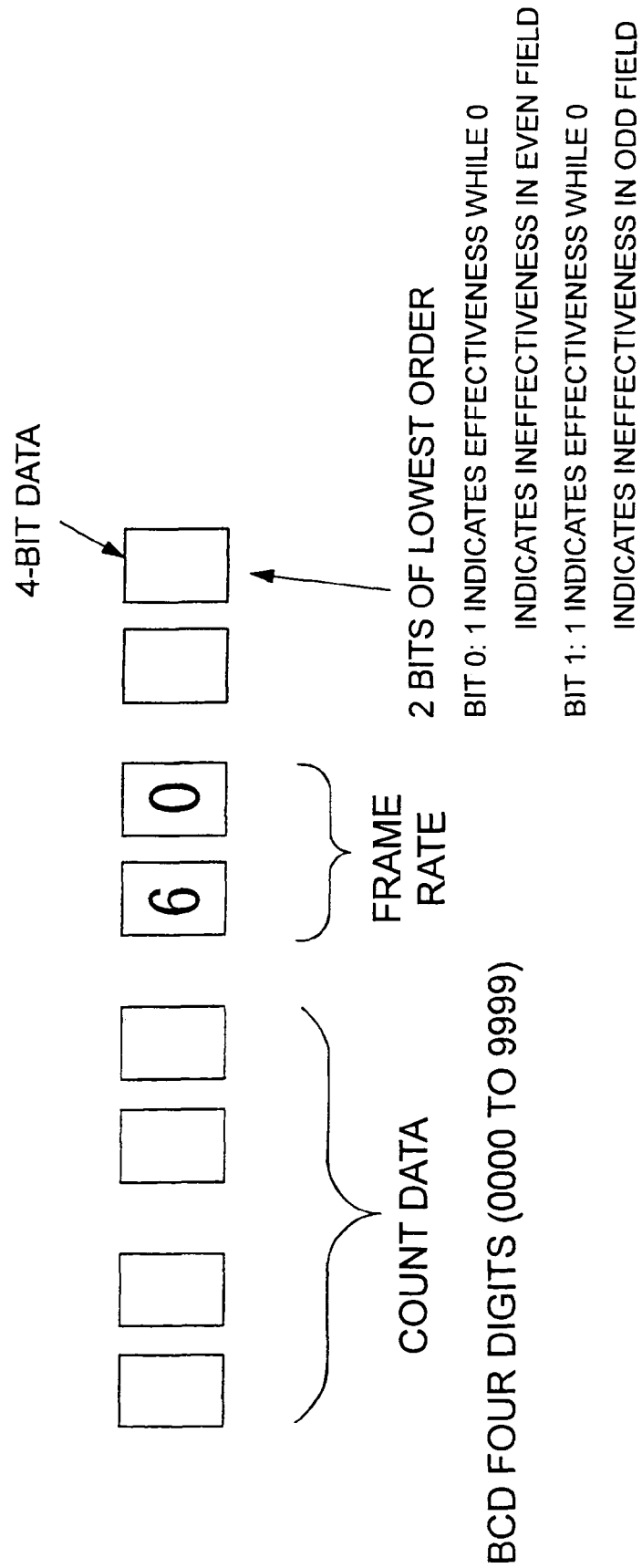

FIG. 8
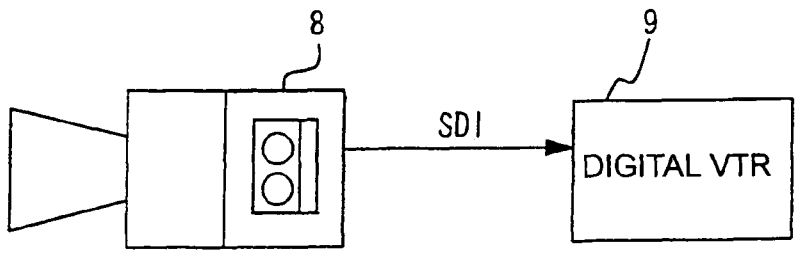
FIG. 9
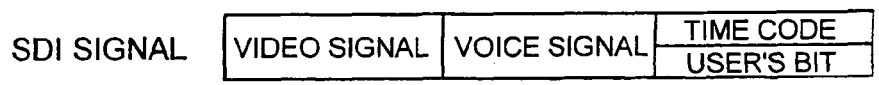
FIG. 10A  OPERATION OF CAMERA INTEGRAL TYPE VTR AND RECORDING INSTRUCTION
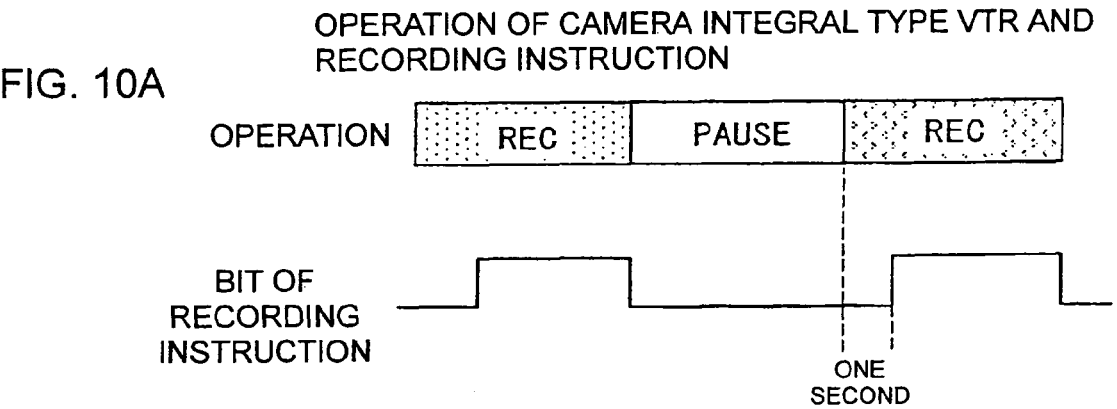
FIG. 10B
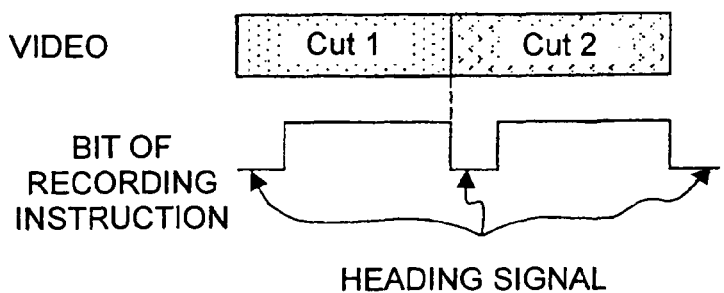

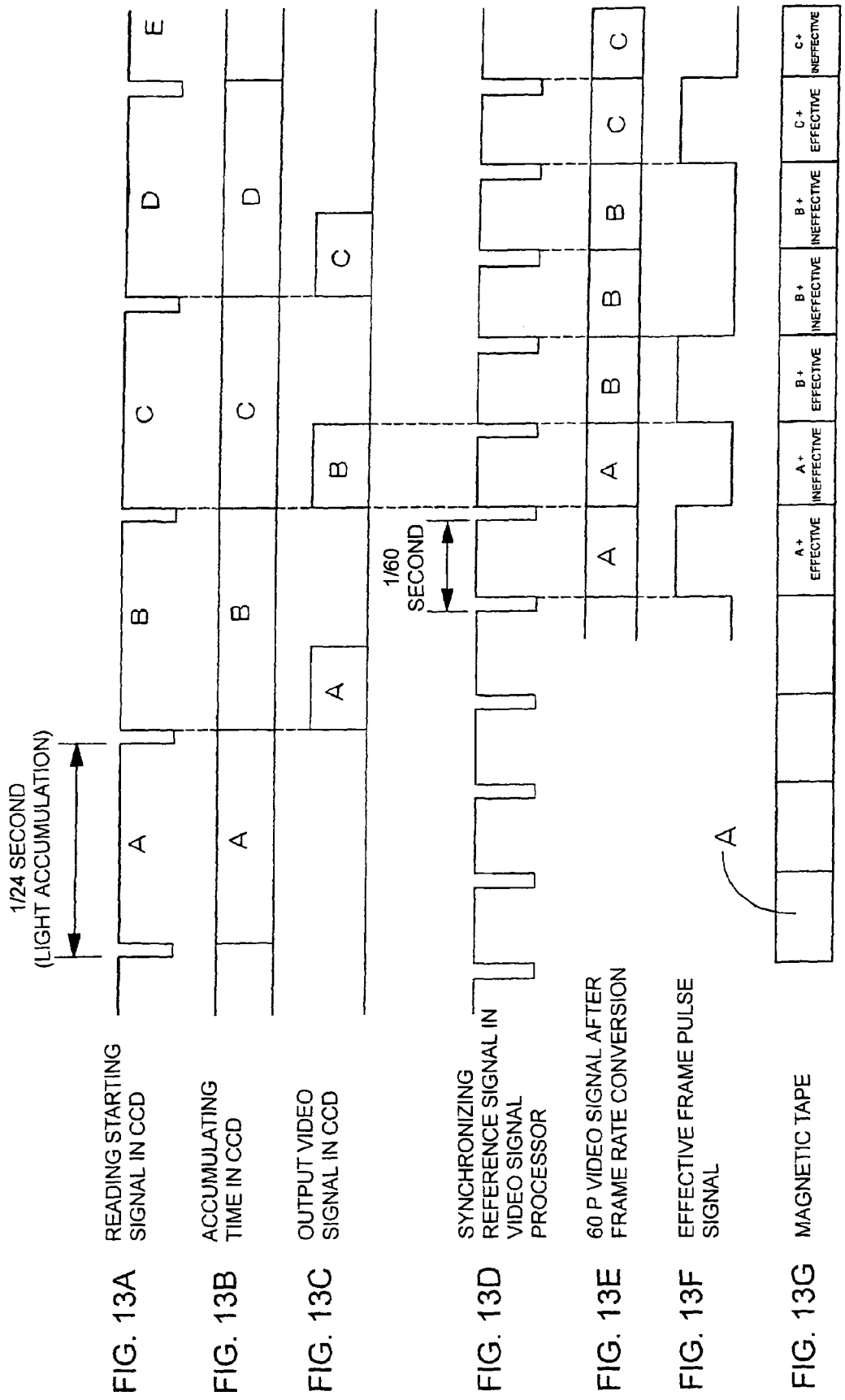

IMAGE PICKUP APPARATUS WITH FRAME RATE CONVERSION INFORMATION OUTPUT

TECHNICAL FIELD

The present invention relates to a pickup apparatus such as a camera integral type VTR or a digital camera.

BACKGROUND ART

There has been conventionally promoted a so-called electronic cinema system for converting pickup data recorded in an analog film into digital video data so as to record the digital video data on a recording medium. This is attributed to the development of an HD (abbreviating high definition) broadcasting equipment. Specifically, a picked-up video signal is digitized, to be thus recorded on a digital video tape or the like. In this case, it is necessary to change a frame rate from a field frequency of 60 Hz in a television system to a field frequency of 24 Hz in a motion picture system. Furthermore, a scanning system is required to be changed from an interlace scanning system to a progressive scanning system.

There has been conventionally proposed a pickup apparatus, which can cope with the electronic cinema system, comprising: a pickup capable of outputting a progressive video signal (hereinafter referred to as "a P video signal") having various frame rates; and a frame rate converter for converting the frame rate of the video signal into a predetermined frame rate. In explanation hereinafter, a progressive video signal having a frame rate of 24 frames/second is referred to as a 24 P video signal; in contrast, a progressive video signal having a frame rate of 60 frames/second is referred to as a 60 P video signal.

The use of the above-described pickup apparatus can achieve pickup recording processing as follows: the pickup first picks up the 24 P video signal, the frame rate converter then converts the frame rate of the picked-up 24 P video signal into the frame rate of the 60 P video signal, and then, records the 60 P video signal on a recording medium. The video signal having such a format converting history can be reproduced and displayed as the 60 P video signal by a general-purpose television picture receiver or the like, and further, the 24 P video signal can be taken out of the 60 P video signal in which the frame rate has been converted since the original 24 P video signal is stored in the 60 P video signal.

However, in the conventional pickup apparatus, the frame rate is converted, and then, the video signal in which the frame rate has been converted is merely output from the pickup apparatus, or the video signal output from the pickup apparatus is merely recorded on the recording medium such as a magnetic tape.

Therefore, even if the recorded video signal is reproduced from the magnetic tape, it is impossible to read data on the value of the frame rate of the video signal output from the pickup apparatus at the time of recording.

Moreover, in the case where frame rate conversion processing for increasing the frame rate in the frame rate converter (for example, conversion processing of converting the frame rate of 24 frames/second to the frame rate of 60 frames/second) is performed, frame data on the video signal before the frame rate conversion (i.e., the 24 P video signal) is arranged redundantly in a frame data group of the video signal after the frame rate conversion (the 60 P video signal). With respect to the video signal subjected to the above-described frame rate conversion processing (the 60 P video signal), post-processing may be performed in a manner described below.

For example, as described above, assume that the frame rate of 24 frames/second suitable for the motion picture system is converted into the frame rate of 60 frames/second suitable for the television system. In the video signal after the frame rate conversion, which has been subjected to the above-described frame rate conversion, (i.e., the 60 P video signal), the video signal after the frame rate conversion (i.e., the 60 P video signal) may be desired to be inversely converted into the original video signal (i.e., the 24 P video signal), so as to achieve the post-processing such as edition.

However, with the configuration of the conventional frame rate conversion, effective frame data cannot be specified out of the frame data on the video signal before the frame rate conversion (i.e., the 24 P video signal) arranged redundantly in the video signal after the frame rate conversion (i.e., the 60 P video signal). Therefore, the above-described inverse conversion processing cannot be efficiently performed.

Thus, an object of the present invention is to efficiently achieve the processing of inversely converting a P video signal in which the frame rate has been converted, into a video signal having an original frame rate.

DISCLOSURE OF THE INVENTION

A pickup apparatus according to the present invention comprises: a pickup for generating a video signal based on an arbitrarily set frame rate; a frame rate converter for converting a frame rate of the video signal output from the pickup into a predetermined frame rate; and a frame rate conversion information output unit for outputting information on frame rate conversion carried out by the frame rate converter in a manner corresponding to a video signal after the frame rate conversion.

Thus, the information on the frame rate conversion (for example, information specifying an effective frame) can be output together with the video signal after the frame rate conversion. If the above-described pickup apparatus according to the present invention is connected to a non-linear editing apparatus or the like, a signal mode of the video signal before the frame rate conversion can be precisely grasped with ease in the non-linear editing apparatus. For example, only a certain video signal of an effective frame can be selected and recorded, thereby achieving an editing operation with high efficiency.

It is preferable that a pickup apparatus according to the present invention should further comprise a recorder for recording, on a recording medium, the video signal after the frame rate conversion output from the frame rate converter and the information on the frame rate conversion output from the frame rate conversion information output unit in association with each other. Thus, both the video signal after the frame rate conversion and the information on the frame rate conversion can be recorded on a recording medium.

It is preferable in a pickup apparatus according to the present invention that a region in which the information on the frame rate conversion is to be recorded should be a user's bit area of a time code area. This is because the user's bit area is a region in which the information can be arbitrarily recorded by an operator in view of the format standard of the video signal. The use of the user's bit area makes it unnecessary to newly and independently set a recording region specifically used for recording the information on the frame rate conversion.

According to the present invention, preferable examples of the information on the frame rate conversion should include information specifying the frame rate before the frame rate conversion. With such information, the frame rate before the frame rate conversion can be readily recognized based on the video signal after the frame rate conversion.

According to the present invention, the preferable examples of the information on the frame rate conversion should include information specifying frame data on the video signal before the frame rate conversion in the video signal after the frame rate conversion. With such information, frame data on the video signal before the frame rate conversion can be readily recognized based on the video signal after the frame rate conversion.

According to the present invention, the preferable examples of the information on the frame rate conversion should include information specifying a pickup starting time and a pickup ending time in the pickup. Thus, the information on the frame rate conversion specifying the pickup starting time and the pickup ending time can be fetched from the pickup apparatus, thereby achieving an editing control of the video signal without providing any special control signal transmitting system for controlling recording start or recording end. Furthermore, the editing control can be achieved with respect to a plurality of recorders in synchronism with one another. Thus, it is enabled to achieve backup recording at the same time as the video signal is recorded.

Moreover, in this case, it is preferable that the information specifying the pickup starting time and the pickup ending time should be output with a delay of a predetermined period of time from an actual pickup starting time and an actual ending time. Thus, the retrieval of a heading position of reproduction can be facilitated.

According to the present invention, a specific constitutional example of the frame rate conversion information output unit should be preferably a frame rate conversion information output unit including: a pulse signal generator for outputting a pulse signal corresponding to frame data of a video signal before frame rate conversion on the video signal after the frame rate conversion as information on the frame rate conversion; and a counter for counting the number of the pulse signals, and then, outputting it.

With this configuration, the output from the pulse signal generator can be used as information specifying the frame data of the video signal before the frame rate conversion on the video signal after the frame rate conversion. Thus, the frame data of the video signal before the frame rate conversion can be readily recognized based on the video signal after the frame rate conversion. Furthermore, the total amount of frame data of the video signal before frame rate conversion on the video signal after the frame rate conversion can be readily recognized based on the output from the counter.

It is preferable that the pickup apparatus according to the present invention should further comprise a display for displaying thereon information on the frame rate conversion so that the information on the frame rate conversion can be readily recognized by visually observing the display contents on the display.

It is preferable that pickup apparatus according to the present invention should further comprise a specific image generator for generating a specific image signal; a user information generator for generating user information, which can be arbitrarily set by an operator; and a video signal selector for selecting either one of a combination of the video signal after the frame rate conversion and the information on the frame rate conversion, and a combination of the specific image signal and the user information, so as to output the combination. Consequently, it is enabled to output the specific image signal and the user information together with the information on the frame rate conversion. Thus, the specific image signal and the user information can be used together with the information on the frame rate conversion.

Preferable examples of the specific image signal should include a color bar signal for generating a color bar.

BRIEF DESCRIPTION OF THE DRAWINGS

FIG. 2A is a timing chart illustrating the case where a 60 P video signal is output as a 60 P video signal;

FIG. 2B is a timing chart illustrating the case where a frame rate of a 30 P video signal is converted into that of the 60 P video signal;

FIG. 3A is a timing chart illustrating the case where a frame rate of a 20 P video signal is converted into that of the 60 P video signal;

FIG. 3B is a timing chart illustrating the case where a frame rate of a 24 P video signal is converted into that of the 60 P video signal;

FIG. 4 is a diagram illustrating recording contents at a user's bit area in the first embodiment;

FIG. 8 is a diagram schematically illustrating a system including a pickup apparatus in a fifth embodiment according to the present invention;

FIG. 9 is a diagram schematically illustrating an SDI signal in the fifth embodiment;

FIG. 10A is a timing chart illustrating operation and a recording instruction in the fifth embodiment;

FIG. 10B is a timing chart illustrating a recording state of a recording medium (i.e., a magnetic tape) in the fifth embodiment;

FIGS. 13A to 13G are timing charts illustrating a recording mode with respect to a magnetic tape when recording is performed after frame rate conversion or a signal adapted to select frame data to be recorded.

BEST MODES FOR CARRYING OUT THE INVENTION

Embodiments according to the present invention are described below in reference to the accompanying drawings.

First Embodiment

Figure 1:
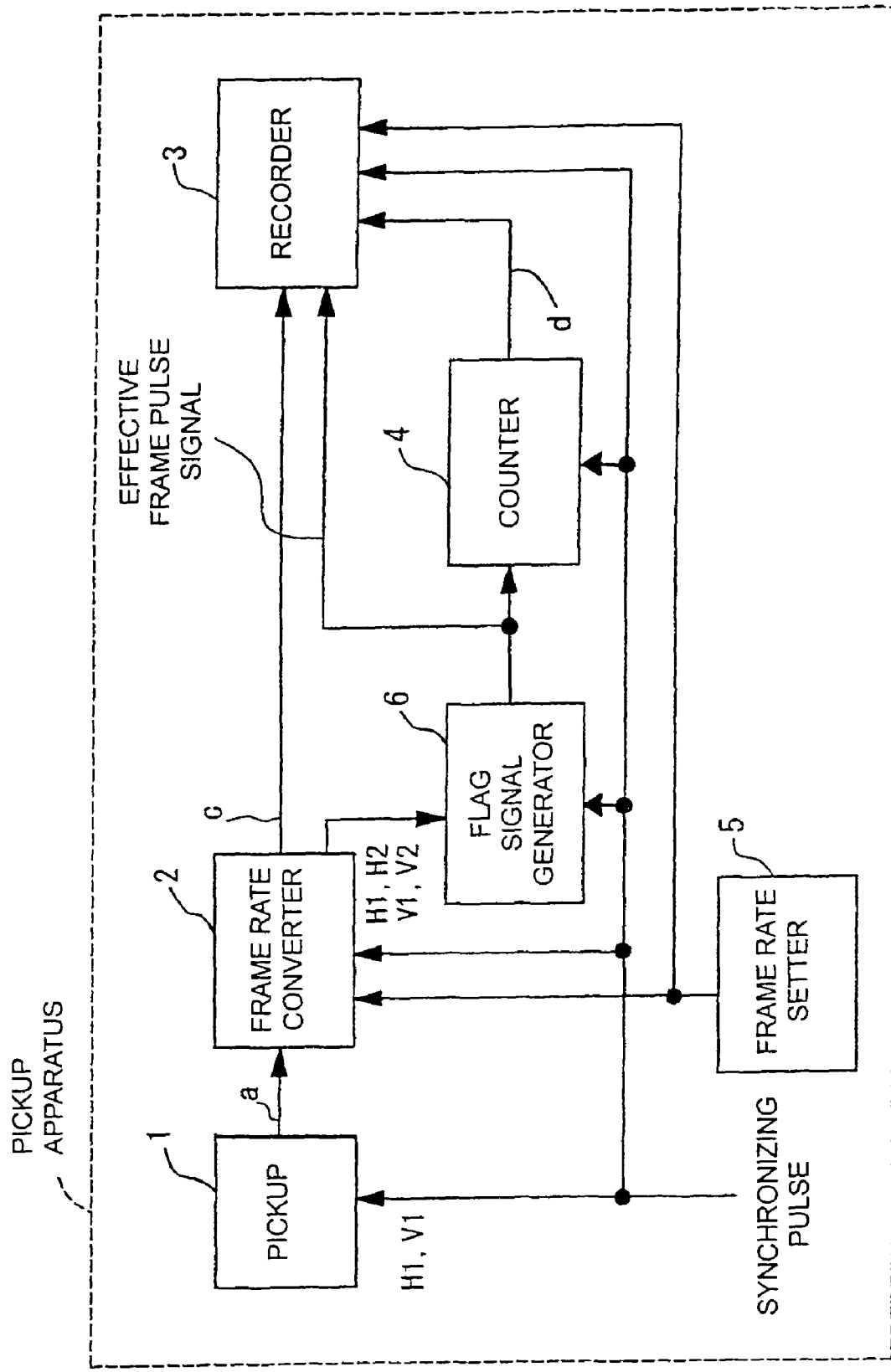
FIG. 1 is a block diagram schematically illustrating a pickup apparatus in a first embodiment according to the present invention.

FIGS. 1 to 4 illustrate a first embodiment according to the present invention. FIG. 1 is a block diagram schematically illustrating a pickup apparatus; FIGS. 2A, 2B, 3A and 3B are timing charts illustrating frame rate conversion; and FIG. 4 is a diagram illustrating recording contents at a user's bit area.

In FIG. 1, reference numeral 1 designates a pickup. The pickup 1 generates P video signals of various frame rates by picking-up processing. Reference numeral 2 denotes a frame rate converter. The frame rate converter 2 converts the P video signal output from the pickup 1 into a P video signal having a predetermined frame rate. Reference numeral 3 designates a recorder. The recorder 3 records an output signal from the frame rate converter 2 on a recording medium such as a magnetic tape. Reference numeral 6 denotes a flag signal generator. The flag signal generator 6 outputs an effective frame pulse signal indicative of an effective frame in the P video signal output from the frame rate converter 2. Reference numeral 4 designates a counter. The counter 4 counts the effective frame pulse signals output from the flag signal generator 6 at a timing corresponding to the predetermined frame rate, and then, outputs the count result. Reference numeral 5 denotes a frame rate setter. The frame rate setter 5 arbitrarily sets a frame rate according to operation by an operator. Furthermore, the frame rate setter 5 outputs set signals to the frame rate converter 2 and the recorder 3, respectively. The pickup apparatus is constituted of the above-described constituent elements.

In FIG. 1, H1 and V1 designate a horizontal synchronizing signal and a vertical synchronizing signal, respectively, to be output from a synchronizing signal generator, not illustrated, to the pickup 1. Moreover, H2 and V2 designate a horizontal synchronizing signal and a vertical synchronizing signal, respectively, after the frame rate conversion.

In the present embodiment, the pickup 1 constitutes one example of a pickup; the frame rate converter 2 constitutes one example of a frame rate converter; the recorder 3 constitutes one example of a recorder; the flag signal generator 6 and the counter 4 constitute one example of a frame rate conversion information output unit; the flag signal generator 6 constitutes one example of a pulse signal generator; and the counter 4 constitutes one example of a counter. Moreover, the effective frame pulse signal output from the flag signal generator 6 and the count result output from the counter 4 constitute one example of information on frame rate conversion.

Next, explanation is made on the operation of the pickup apparatus in the case where a signal is picked up by the pickup 1 at frame rates of 60 frames/second, 30 frames/second, 20 frames/second and 24 frames/second. In the drawings, a 60 P video signal indicates a P video signal having a frame rate of 60 frames/second; a 30 P video signal indicates a P video signal having a frame rate of 30 frames/second; a 20 P video signal indicates a P video signal having a frame rate of 20 frames/second; and a 24 P video signal indicates a P video signal having a frame rate of 24 frames/second.

FIG. 2A is a timing chart illustrating the case where a video signal picked up as the 60 P video signal is output as the 60 P video signal without any frame rate conversion, and then, is recorded on a recording medium (such as a magnetic tape). FIG. 2B is a timing chart illustrating the case where a video signal picked up as the 30 P video signal is output after frame rate conversion as the 60 P video signal, and then recorded on the recording medium (such as the magnetic tape). FIG. 3A is a timing chart illustrating the case where a video signal picked up as the 20 P video signal is output after the frame rate conversion as the 60 P video signal, and then recorded on the recording medium (such as the magnetic tape). FIG. 3B is a timing chart illustrating the case where a video signal picked up as the 24 P video signal is output after the frame rate conversion as the 60 P video signal, and then recorded on the recording medium (such as the magnetic tape).

In FIGS. 2A, 2B, 3A and 3B, No. 1 illustrates the arrangement of the P video signals after the frame rate conversion (in this case, all are 60 P video signals). In No. 1, numerals marked inside of frame data constituting the P video signal after the frame rate conversion indicate serial numbers of frame data constituting a P video signal before the frame rate conversion. No. 2 illustrates output data of the counter 4. Moreover, No. 3 illustrates the effective frame pulse signal. In No. 3, an effective frame of the P video signal after the frame rate conversion is specified during a High period. Numerals marked inside of the effective frame pulses indicate serial numbers specifying the frame data of the P video signal before the frame rate conversion. The positions of the frame data of the P video signal after the frame rate conversion correspond to pulse regions of the effective frame pulse signals, respectively.

In the case where the video signal picked up as the 60 P video signal is output as the 60 P video signal without any frame rate conversion, the flag signal generator 6 outputs the effective frame pulse signal in which the level can be varied per 1/60 second with respect to the 60 P video signal output from the pickup 1, as illustrated in FIG. 2A. At this time, the counter 4 counts the effective frame pulse signals, and then, outputs the count result to the recorder 3. The counter 4 updates and outputs the count data per 1/30 second while counting at all times. Therefore, in FIG. 2A, the counter 4 outputs, to the recorder 3, the count data added with two to an initial value, i.e., one per 1/30 second.

When the recorder 3 records the 60 P video signal after frame rate conversion (no conversion in this case) supplied from the frame rate converter 2 on the recording medium (such as the magnetic tape), it performs processing as described below.

The 60 P video signal has a time code area of an LTC (abbreviating a linear time code) or a VITC (abbreviating a vertical interval time code). At these time code areas, code areas are sequentially set per 1/30 second. That is to say, the time code area is a code marking area, at which a code or information is updated per 1/30 second. Consequently, in the 60 P video signal, pairs of odd and even frames correspond to the time code areas in a one-to-one manner.

The time code area such configured as described above has a user's bit area (consisting of binary groups) having a recording region of eight digits, as illustrated in FIG. 4. The recorder 3 writes next information at the user's bit area formed at the time code area.

As illustrated in FIG. 4, the recorder 3 writes the count data of the counter 4 in a bit region of first to fourth digits from the highest order of the user's bit area; it writes a set frame rate of the frame rate setter 5 (60 in the case of 60 P) in a bit region of fifth and sixth digits from the highest order; and it writes information specifying the position of the effective frame in a bit region of a lowest order.

The information specifying the position of the effective frame signifies information indicative of whether a frame arranged at the even frame position (hereinafter referred to as "an even frame") or a frame arranged at the odd frame position (hereinafter referred to as "an odd frame") in the P video signal after the frame rate conversion (the 60 P video signal in this case) becomes effective.

The above-described information specifying the position of the effective frame is specifically written in a manner described below. For example, the information specifying the effective frame information is written in two bits positioned lower than in the bit region (four bits) of the lowest order, as illustrated in FIG. 4. A bit positioned in an upper order out of the above-described two bits corresponds to the odd frame of the P video signal after the frame rate conversion; in contrast, a bit positioned in a lower order corresponds to the even frame of the P video signal after the frame rate conversion. In these bits, data "0" indicates ineffectiveness; in contrast, data "1" indicates effectiveness.

In the case illustrated in FIG. 2A, in which the 60 P video signal is recorded without any frame rate conversion, all of the frames become effective frames in the 60 P video signal after the frame rate conversion (no conversion in this case). Therefore, the effective frame pulse signal becomes a High level in all of the frame regions. Consequently, the flag signal generator 6 outputs, to the counter 4 and the recorder 3, the effective frame pulse signal in which the regions corresponding to all of the frames of the 60 P video signal become High. The counter 4 outputs, to the recorder 3, the count data added with two to the initial value, i.e., one per $\frac{1}{30}$ second. The flag signal generator 6 and the counter 4 perform outputting at a timing in synchronism with the P video signal after the frame rate conversion (i.e., the 60 P video signal) based on a synchronizing pulse.

The recorder 3, to which the above-described various kinds of information are supplied, writes the count data of 0001 at the user's bit area corresponding to the first frame and the second frame in the 60 P video signal after the frame rate conversion; it writes the count data of "0003" at the user's bit area corresponding to the third frame and the fourth frame; it writes the count data of "0005" at the user's bit area corresponding to the fifth frame and the sixth frame; and it writes the count data at the user's bit areas corresponding to the seventh and consecutive frames in the same manner. Furthermore, "60" indicating that the frame rate before the frame rate conversion is 60 frames/second is written in the fifth digit and the sixth digit of the user's bit area. Here, the recorder 3 records the information on the frame rate conversion on the recording medium (such as a magnetic tape A) in synchronism with the synchronizing pulse. Moreover, the recorder 3 specifies the frame rate before the frame rate conversion based on the frame rate setting information supplied from the frame rate setter 5.

Additionally, in the case illustrated in FIG. 2A, in which the 60 P video signal is recorded without any frame rate conversion, the effective frame pulse signal becomes the High level in all of the frame regions, as described above. The time code areas are set every two frames (i.e., $\frac{1}{30}$ second), as described above. Therefore, a bit pattern "11" is recorded as the position specifying information of the effective frame in the two bits of the lowest order at each of the user's bit area. This shows that all of the odd frames and the even frames are the effective frames.

In the case illustrated in FIG. 2B, in which the 30 P video signal is converted at the frame rate into the 60 P video signal, the odd frame, for example, becomes the effective frame in the 60 P video signal after the frame rate conversion. In this case, the region corresponding to the odd frame of the 60 P video signal after the frame rate conversion in the effective frame pulse signal becomes the High level. Therefore, the flag signal generator 6 outputs, to the counter 4 and the recorder 3, the effective frame pulse signal in which the region corresponding to the odd frame of the 60 P video signal becomes High. The counter 4 outputs, to the recorder 3, the count data added with one to the initial value, i.e., one per $\frac{1}{30}$ second.

The recorder 3, to which the above-described various kinds of information are supplied, writes the count data of 0001 at the user's bit area corresponding to the first frame and the second frame in the 60 P video signal after the frame rate conversion; it writes the count data of "0002" at the user's bit area corresponding to the third frame and the fourth frame; it writes the count data of "0003" at the user's bit area corresponding to the fifth frame and the sixth frame; and it writes the count data at the user's bit areas corresponding to the seventh and consecutive frames in the same manner. Furthermore, "30" indicating that the frame rate before the frame rate conversion is 30 frames/second is written in the fifth digit and the sixth digit of the user's bit area.

Moreover, in the case illustrated in FIG. 2B, in which the 30 P video signal is converted at the frame rate into the 60 P video signal, the odd frame, for example, becomes the effective frame in the 60 P video signal after the frame rate conversion, as described above. Therefore, the effective frame pulse signal becomes the High level in a region corresponding to the odd frame. Therefore, a bit pattern "10" is recorded as the position specifying information of the effective frame in the two bits of the lowest order at the user's bit area set every two frames (i.e., $\frac{1}{30}$ second). This shows that the odd frame is the effective frame.

In the case illustrated in FIG. 3A, in which the 20 P video signal is converted at the frame rate into the 60 P video signal, the effective frames are set every three frames in the 60 P video signal after the frame rate conversion. Consequently, the effective frame pulse signal becomes the High level in a cycle of three frames. Therefore, the flag signal generator 6 outputs the effective frame pulse signal, which becomes in a High level in a cycle of three frames, of the 60 P video signal to the counter 4 and the recorder 3. In this case, since the effective frame pulse signal is output in a cycle of three frames ($\frac{1}{20}=3\times\frac{1}{60}$) of the 60 P video signal after the frame rate conversion, the counter 4, which updates the count in a cycle of $\frac{1}{30}$ second, repeats the processing of incrementing the count data by one and the processing of not incrementing the count data per $\frac{1}{30}$ second, and then, outputs the count data to the recorder 3.

The recorder 3, to which the above-described various kinds of information are supplied, writes the count data of "0001" at the user's bit area corresponding to the first frame and the second frame in the 60 P video signal after the frame rate conversion; it writes the count data of "0002" at the user's bit area corresponding to the third frame and the fourth frame; it writes the count data of "0002" at the user's bit area corresponding to the fifth frame and the sixth frame; it writes the count data of "0003" at the user's bit area corresponding to the seventh frame and the eighth frame; and it writes the count data at the user's bit areas corresponding to the ninth and consecutive frames in the same manner. Furthermore, "20" indicating that the frame rate before the frame rate conversion is 20 frames/second is written in the fifth digit and the sixth digit of the user's bit area.

Moreover, in the case illustrated in FIG. 3A, in which the 20 P video signal is converted at the frame rate into the 60 P video signal, there are a frame region in which the even frame becomes the effective frame, a frame region in which neither the odd frame nor the even frame becomes the effective frames, and a frame region in which the odd frame becomes the effective frame in the 60 P video signal after the frame rate conversion, as described above. Therefore, a next bit pattern is recorded as the position specifying information of the effective frame in the two bits of the lowest order at the user's bit area set every two frames (i.e., $\frac{1}{30}$ second).

A bit pattern "01" is recorded at the user's bit area corresponding to the frame region in which the even frame becomes the effective frame; a bit pattern "00" is recorded at the user's bit area corresponding to the frame region in which neither the odd frame nor the even frame becomes the effective frames; and a bit pattern "10" is recorded at the user's bit area corresponding to the frame region in which the odd frame becomes the effective frame.

In the case illustrated in FIG. 3B, in which the 24 P video signal is converted at the frame rate into the 60 P video signal, frame regions in which the effective frames are set every two frames and frame regions in which the effective frames are set every three frames are alternately arranged in sequence in the 60 P video signal after the frame rate conversion. In this case, regions of a High level in a cycle of two frames and regions of a High level in a cycle of three frames are alternately arranged in sequence in the effective frame pulse signal. Consequently, the flag signal generator 6 outputs the effective frame pulse signal having a signal mode, in which the regions of a High level in a cycle of two frames of the 60 P video signal and the regions of a High level in a cycle of three frames are alternately repeated, to the counter 4 and the recorder 3. In this case, since the effective frame pulse signal is output in a cycle of combination of the cycle of two frames ($\frac{1}{30} = 2 \times \frac{1}{60}$) of the 60 P video signal after the frame rate conversion and the cycle of three frames ($\frac{1}{20} = 3 \times \frac{1}{60}$), the counter 4, which updates the count in a cycle of $\frac{1}{30}$ second, repeats the processing of incrementing the count data by one and the processing of not incrementing the count data per predetermined cycle, and then, outputs the count data to the recorder 3.

The recorder 3, to which the above-described various kinds of information are supplied, writes the count data of "0001" at the user's bit area corresponding to the first frame and the second frame in the 60 P video signal after the frame rate conversion; it writes the count data of "0002" at the user's bit area corresponding to the third frame and the fourth frame; it writes the count data of "0003" at the user's bit area corresponding to the fifth frame and the sixth frame; it writes the count data of "0003" at the user's bit area corresponding to the seventh frame and the eighth frame; it writes the count data of "0004" at the user's bit area corresponding to the ninth frame and the tenth frame; and it writes the count data at the user's bit areas corresponding to the eleventh and consecutive frames in the same manner. Furthermore, "24" indicating that the frame rate before the frame rate conversion is 24 frames/second is written in the fifth and the sixth digit of the user's bit area.

Moreover, in the case illustrated in FIG. 3B, in which the 24 P video signal is converted at the frame rate into the 60 P video signal, there are a frame region in which the even frame becomes the effective frame, a frame region in which neither the odd frame nor the even frame becomes the effective frames, and a frame region in which the even frame becomes the effective frame in the 60 P video signal after the frame rate conversion, as described above. Therefore, a next bit pattern is recorded as the position specifying information of the effective frame in the two bits of the lowest order at the user's bit area set every two frames (i.e., $\frac{1}{30}$ second).

A bit pattern "01" is recorded at the user's bit area corresponding to the frame region in which the even frame becomes the effective frame; a bit pattern "00" is recorded at the user's bit area corresponding to the frame region in which neither the odd frame nor the even frame becomes the effective frames; and a bit pattern "10" is recorded at the user's bit area corresponding to the frame region in which the odd frame becomes the effective frame.

In this manner, in recording the signal on the recording medium after the frame rate conversion of the P video signal obtained in the pickup 1, the effective frame specifying the frame data on the P video signal before the frame rate conversion, the count data on the number of effective frames and the frame rate information on the P video signal before the frame rate conversion are recorded on the recording medium. Consequently, even if the signal is recorded on the recording medium after the frame rate conversion of the P video signal, it is enabled to readily grasp pickup information stored in the P video signal before the frame rate conversion with high accuracy.

Although the recorder 3 is included in the above-described first embodiment, the present invention can be satisfactorily implemented by only the pickup apparatus (comprising the pickup 1, the frame rate converter 2, the frame rate setter 5 and the flag signal generator 6). Moreover, the present invention can be implemented as a camera integral type pickup recording apparatus in which the pickup apparatus, the counter 4 and the recorder 3 are configured in an integral manner.

Second Embodiment

Figure 5:
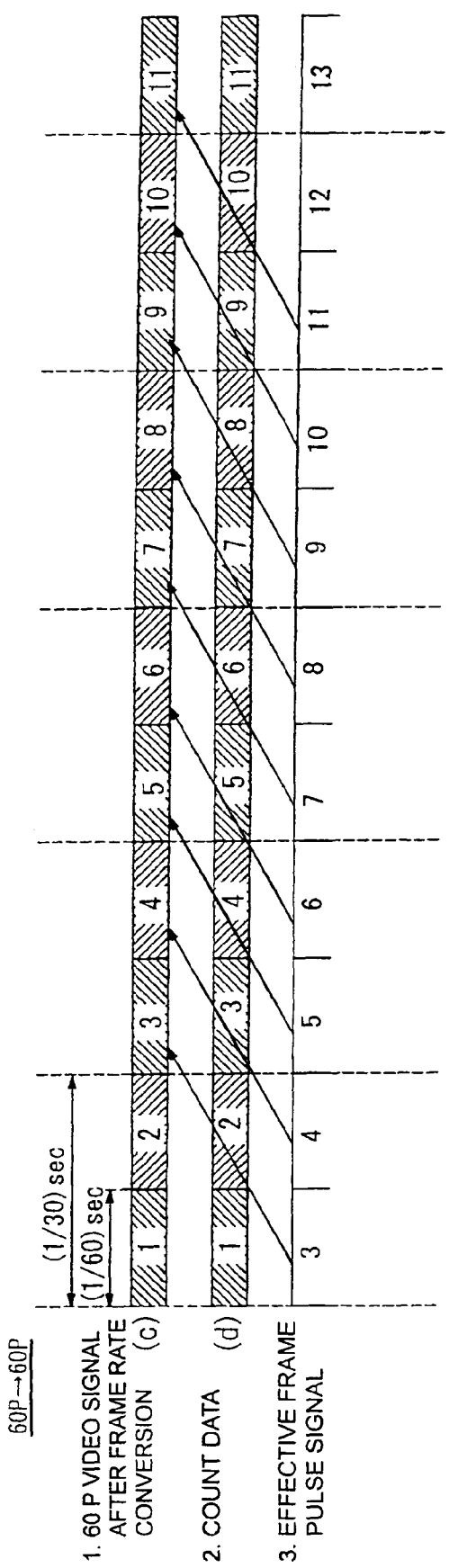
FIG. 5 is a timing chart illustrating the case where the frame rate is converted (a 60 P video signal to a 60 P video signal) in a second embodiment.

The example in which the two frames of the 60 P video signal after the frame rate conversion are used as the same count data to be recorded at the user's bit area of the time code area has been described above in the first embodiment. However, as illustrated in FIG. 5, the count data may be configured in such a manner as to be updated per frame of a P video signal after frame rate conversion (a 60 P video signal or the like). Although the present embodiment is described in reference to FIG. 5 illustrating the case where a video signal before frame rate conversion picked up as the 60 P video signal is output and recorded as the 60 P video signal without any frame rate conversion, the present embodiment can be implemented in the same manner even in the case where the frame rate conversion is carried out.

In this case, since the frame data before the frame rate conversion and the count data existing in the P video signal after the frame rate conversion correspond to each other in a one-to-one manner, it is enabled to identify the video signal per frame in editing, and therefore, to edit an image with high accuracy.

Third Embodiment

Figure 6:
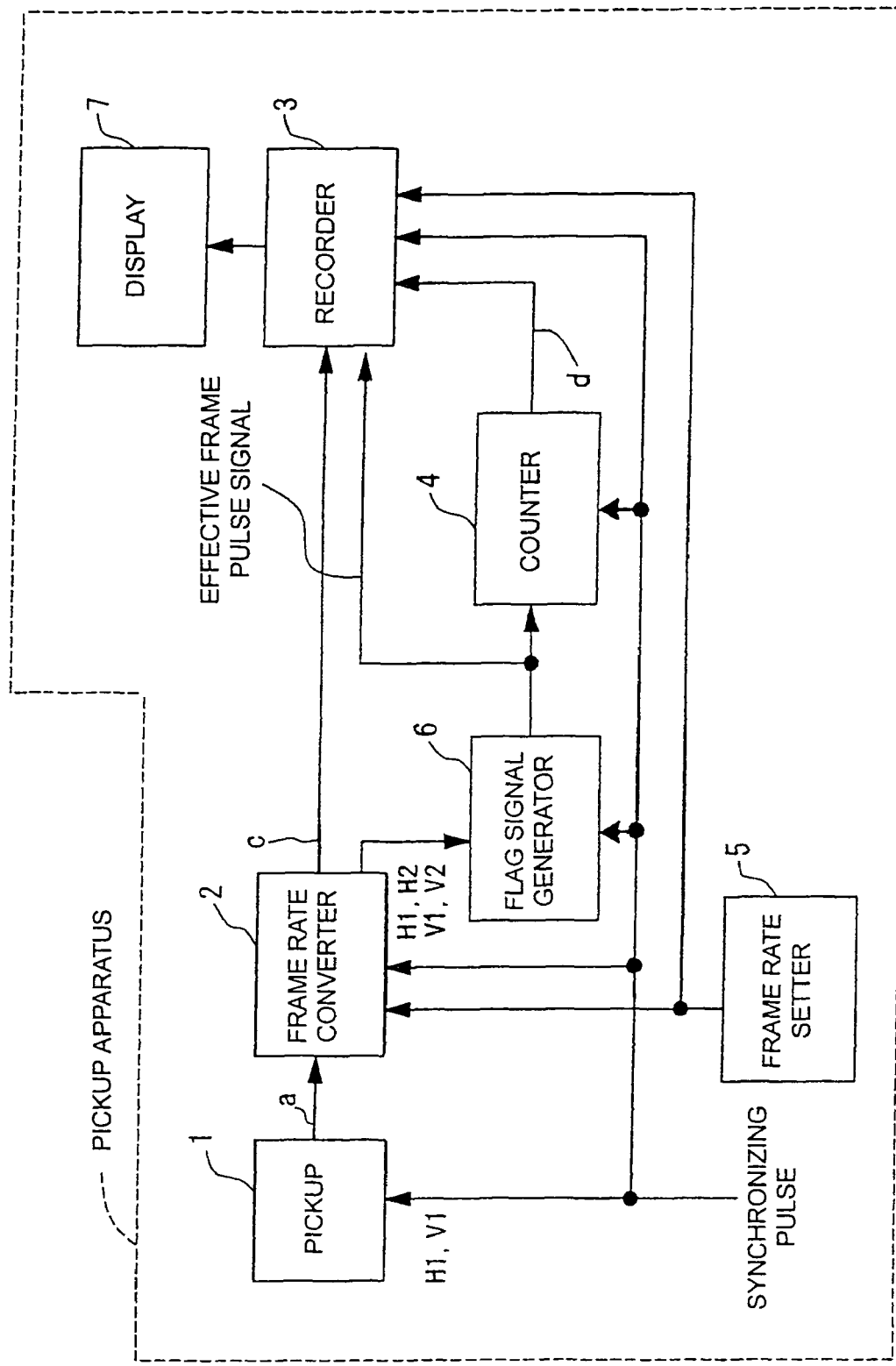
FIG. 6 is a block diagram schematically illustrating a pickup apparatus in a third embodiment according to the present invention.

FIG. 6 illustrates a pickup apparatus further comprising a display 7 in addition to the configuration in the first embodiment.

The display 7 is constituted of, for example, a liquid crystal display, which can fetch various kinds of information stored at a user's bit area of a P video signal after frame rate conversion from a recorder 3, and then display it. Consequently, a user can recognize the information stored at the user's bit area of the P video signal after the frame rate conversion. In the present embodiment, the display 7 constitutes one example of a display. The display 7 may be provided in the pickup apparatus, or independently of the pickup apparatus.

Fourth Embodiment

Figure 7:
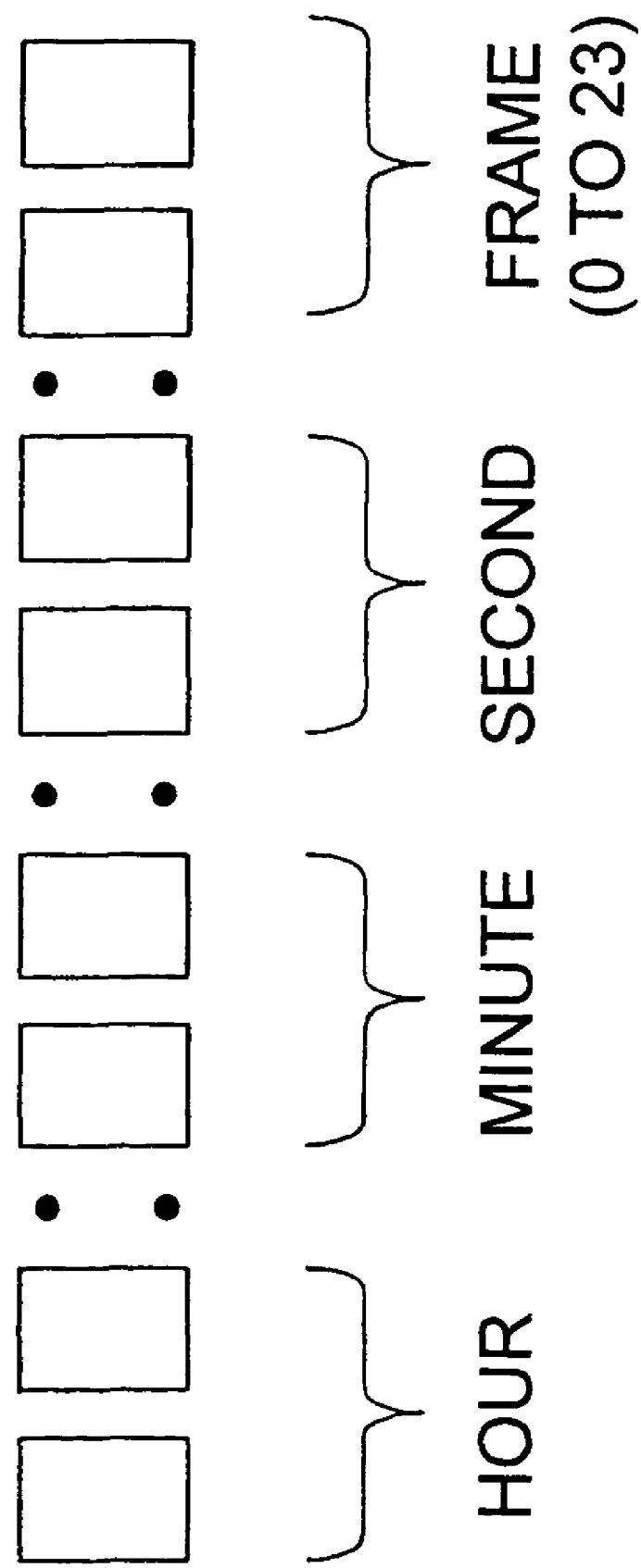
FIG. 7 is a diagram illustrating recording contents at a user's bit area in a fourth embodiment according to the present invention.

As illustrated in FIG. 7, in a P video signal after frame rate conversion output from a frame rate converter 2 in a pickup apparatus similar to the pickup apparatuses in the above-described embodiments, a recorder 3 records an hour, a minute and a second in a time code on a recording medium, and further, it may record a frame number corresponding to the number of frames per unit time of a frame rate, i.e., per second in association with time display. This is explained below.

For example, assume that a 24 P video signal picked up at a frame rate of 24 frames/second is converted at a frame rate into a 60 P video signal, to be then recorded on a recording medium. In this case, there is adopted a code mode in which 30 counts (00 to 29) are counted up for one second as the number of frames of the time code and the number of counts is updated per second in the 60 P video signal after the frame rate conversion. In contrast, a time code of a 24 P video signal before the frame rate conversion adopts a time code mode in which the number of frames (00 to 23) is updated every 24 counts per second. Therefore, numerals of 23 or greater (24 to 29) are recorded in the time code as the number of frames in the 60 P video signal after the frame rate conversion. Then, the number of frames having no accurate accordance with respect to the 24 P video signal before the frame rate conversion occurs in the time code, resulting in an abnormal condition.

Thus, in the case where the frame rate conversion in such a manner as to have a greater frame rate is carried out (for example, the 24 P video signal is converted at the frame rate into the 60 P video signal), a frame value (00 to 23) corresponding to the 24 P video signal before the frame rate conversion is attached to the time code of the 60 P video signal after the frame rate conversion.

The frame value (00 to 23) corresponding to the 24 P video signal before the frame rate conversion herein can be set by using the count data of the counter 4 in the configuration illustrated in FIG. 1. That is to say, in the case where the P video signal before the frame rate conversion is the 24 P video signal, the count data of the counter 4 repeats from 0 to 23 for one second, and further, no count data is varied in a frame which is not an effective frame. Consequently, a value output from the counter 4 can be used as a frame digit of the time code.

Incidentally, the time code information, which has been varied in the above-described manner, may be displayed by utilizing the display 7 in the above-described third embodiment.

Fifth Embodiment

FIG. 8 illustrates a system, in which a video signal, a voice signal and time code information output from a digital camera integral type VTR 8 provided with the pickup apparatus according to the present invention via an SDI (abbreviating a serial digital interface) are transmitted to a digital VTR (i.e., a recorder) 9, which then performs recording. This system is one example of a pickup recording system which is configured so that the pickup apparatus and the recorder are connected to each other via a signal line. The pickup apparatus in the present embodiment is configured in basically the same manner as those in the first to fourth embodiments.

In view of the SDI standard, in the case where the video signal is transmitted from the digital camera integral type VTR 8 to the digital VTR 9, a 32-bit user's bit area is provided at a time code area provided in the SDI signal to be transmitted. In the present embodiment, an area for one bit in this user's bit area is referred to as a recording instructing information area. Specifically, as illustrated in FIG. 9, a video signal recording area, a voice signal recording area and a time code recording area are included in the recording area for one frame of the SDI signal. A 32-bit user's bit area is further included in the time code recording area. In the present embodiment, one bit in the above-described user's bit area is used as a recording area for a recording starting instruction and a recording ending instruction.

An operating unit consisting of a recording starting/ending switch and the like is provided in the digital camera integral type VTR 8, although not illustrated. In picking up a signal by the digital camera integral type VTR 8 having the above-described configuration, control is performed in a manner described below.

Next information is stored in a bit region storing recording instructing information at the user's bit area in the SDI signal. That is to say, a pickup continuing signal consisting of a predetermined value (for example, 1) is output to the bit region during a period when the digital camera integral type VTR 8 continues picking up a signal in accordance with an input operation with respect to the operating unit. In contrast, a pickup ending signal consisting of a predetermined value different from the above-described predetermined value (for example, 0) is output to the bit region during a period when the digital camera integral type VTR 8 stops picking up a signal in accordance with the input operation with respect to the operating unit. Furthermore, the above-described pickup continuing signal is output with a delay of one second from the actual starting time at the time when an image is started to be picked up. The pickup ending signal and the pickup continuing signal may be generated and output in accordance with an operation instruction input with respect to the operating unit by, for example, the flag signal generator 6, or they may be output with another configuration (for example, from the operating unit per se).

Figure 11:
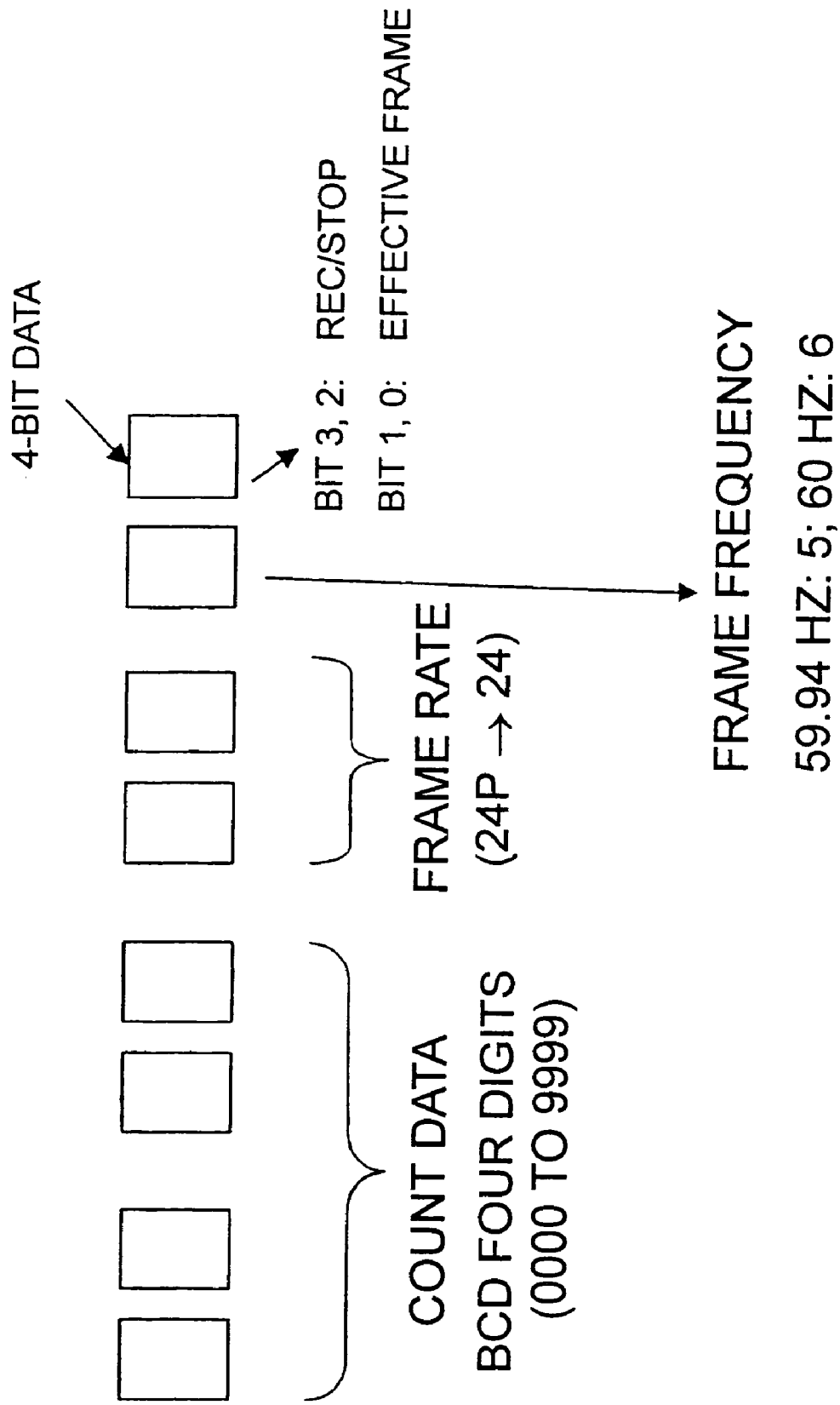
FIG. 11 is a diagram illustrating recording contents at a user's bit area in the fifth embodiment.

Such information is recorded at the user's bit area of the recording medium, as illustrated in, for example, FIG. 11. That is to say, the information is assigned in a 2-bit data region out of data on its lowest four bits together with information representing the setting of the count data and the frame rate and information representing the setting of a frame frequency (specifically, "5" for 59.94 Hz; and "6" for 60 Hz). The information configured as described above is recorded on the recording medium (i.e., the magnetic tape) in the digital VTR 9. Incidentally, information specifying an effective frame position is stored in another 2-bit data region out of the data on its lowest four bits.

When such information is stored at the user's bit area of the recording medium, an editing control described below can be performed. As illustrated in, for example, FIG. 10A, assume the case where editing for deleting a corresponding pose region at the time when the picking-up is stopped is performed by editing the P video signal after the frame rate conversion recorded on the recording medium. In this case, as illustrated in FIG. 10B, if the above-described information is stored at the user's bit area of the recording medium, the recording instruction is switched to at a timing with a delay of one second from a start time of a following cut at a boundary between the preceding cut and the following cut. Consequently, it is enabled to search a heading position of each of the video signals on the recording medium even in an unnaturally continued pickup mode without any interruption of an image signal by the editing operation. This is because the heading position can be specified by searching a position at which the recording instruction is interrupted since the recording instruction is issued with a delay of one second in the video signal after the editing. Thus, it is unnecessary to independently record the information for searching the heading position on the recording medium.

Sixth Embodiment

Figure 12:
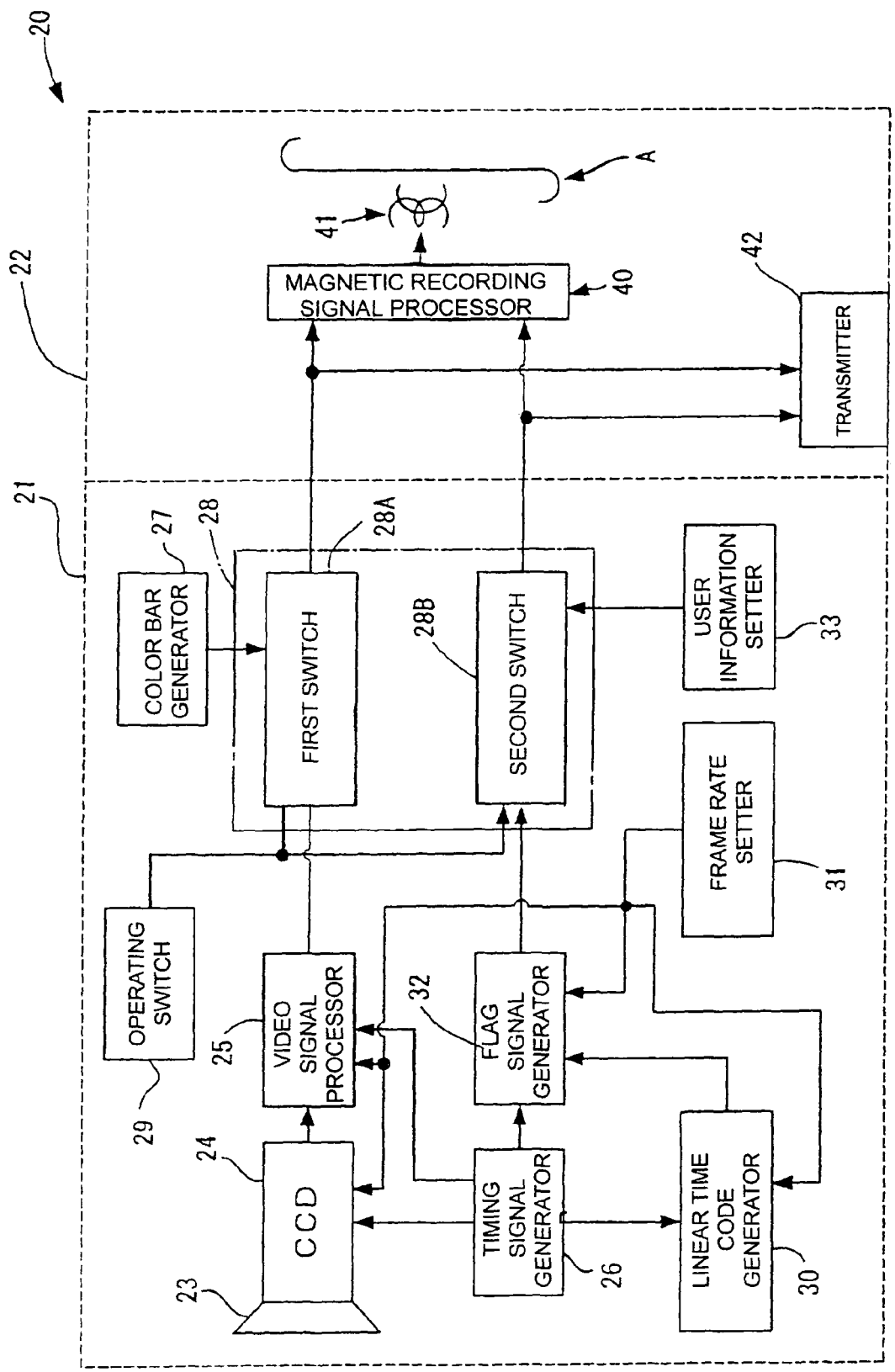
FIG. 12 is a block diagram illustrating a pickup apparatus in a sixth embodiment according to the present invention.

FIGS. 12 and 13 illustrate a digital camera integral type VTR 20 in a sixth embodiment according to the present invention, wherein FIG. 12 is a block diagram illustrating the digital camera integral type VTR 20; and FIG. 13 is a timing chart of each of the controls in the case where the frame rate of a P video signal at the time of picking-up is converted, to be then recorded on a magnetic tape.

In the digital camera integral type VTR 20 in the present embodiment, reference numeral 21 designates a pickup; 22, a recorder; 23, a picking-up lens mechanism; and 24, a CCD. The CCD 24 converts, at a frame rate, optical information emitted from a subject via the picking-up lens mechanism 23 into an electric signal. Reference numeral 25 denotes a video signal processor. The video signal processor 25 performs signal processing for recording the electric signal supplied from the CCD 24 on a magnetic tape A as a video signal and frame rate conversion processing. Reference numeral 26 designates a timing signal generator. The timing signal generator 26 generates a timing signal, and then, supplies it to the video signal processor 25 or the like. Reference numeral 27 denotes a color bar generator. The color bar generator 27 generates a color bar signal for displaying a color bar image for adjusting an image (an EIA color bar, an SMPTE color bar, a full field color bar and the like). Reference numeral 28 designates a switch unit. The switch unit 28 includes a first switch 28A and a second switch 28B. The first switch 28A receives the color bar signal output from the color bar generator 27 and the video signal output from the video signal processor 25. The first switch 28A arbitrarily switches these received signals, and then, outputs the signal to the recorder 22. The second switch 28B receives code information output from a user information setter 33 and effective flag information output from a flag signal generator 32. The second switch 28B arbitrarily switches these received signals, and then, outputs the signal to the recorder 22. Reference numeral 29 denotes an operating switch. The operating switch 29 outputs an ON operation signal generated by an ON operation by an operator to the first switch 28A and the second switch 28B. Reference numeral 30 designates a linear time code generator. The linear time code generator 30 generates a time code based on a synchronizing reference signal to be transmitted from the timing signal generator 26 to the video signal processor 25. Reference numeral 31 denotes a frame rate setter. The frame rate setter 31 sets a frame rate at the time of the picking-up by the CCD 24 and a frame rate at the time of the recording. Reference numeral 32 designates the flag signal generator. The flag signal generator 32 generates the effective flag information (i.e., an effective frame pulse signal) based on a time code generated by the linear time code generator 30. The effective flag information is a signal similar to the effective frame pulse signal described in the first to fifth embodiments. Reference numeral 33 denotes the user information setter. The user information setter 33 automatically converts, at the frame rate, information input by the operator via an input unit, not illustrated, (for example, special remarks such as a pickup location and a pickup time) into code information which can be recorded at the user's bit area (this information will be hereinafter referred to as user information), and then, outputs it. The constituent elements 22 to 33 described above are incorporated in the pickup 21.

In the present embodiment, the color bar generator 27 constitutes one example of a characteristic image generator; the user information setter 33 constitutes one example of a user information generator; and the operating switch 29 constitutes one example of a video signal selector.

Reference numeral 40 designates a magnetic recording signal processor. The magnetic recording signal processor 40 converts, at the frame rate, a P video signal output from the video signal processor 25 into a magnetic recording signal. Reference numeral 41 denotes a magnetic head. The magnetic head 41 records the magnetic recording signal on the magnetic tape A. Reference numeral 42 designates a transmitter. The transmitter 42 outputs the magnetic recording signal and the like to the outside. The magnetic recording signal processor 40, the magnetic head 41 and the transmitter 42 are incorporated in the recorder 22.

Next, a description is given of operation of the digital camera integral type VTR 20 having the above-described configuration.

The frame rate setter 31 sets the frame rate at the time of picking-up by the CCD 24 and the frame rate at the time of recording. The frame rate setter 31 outputs the pieces of set frame rate information to the CCD 24, the video signal processor 25, the flag signal generator 32 and the linear time code generator 30, respectively.

The linear time code generator 30 generates a time code in accordance with the frame rate based on the frame rate setting information. The timing signal generator 26 generates a reading starting signal for the CCD 24 for the purpose of the synchronization of output timings between the effective frame pulse signal and the P video signal in recording the signal in the magnetic tape A. The timing signal generator 26 outputs the reading starting signal to the CCD 24, the video signal processor 25 and the flag signal generator 32, respectively.

The CCD 24 performs the picking-up in accordance with the set frame rate, and then, outputs the resultant P video signal to the video signal processor 25. The video signal processor 25 subjects the picked-up P video signal to various kinds of signal processings. Furthermore, the video signal processor 25 converts, at the frame rate, the P video signal after the frame rate conversion. The frame rate after the frame rate conversion is set based on the frame rate setting information output from the frame rate setter 31.

The video signal processor 25 performs the above-described signal processing, and thus, generates the P video signal after the frame rate conversion. The P video signal after the frame rate conversion is output from the video signal processor 25 to the first switch 28A.

In the meantime, the flag signal generator 32 generates the effective flag information, and further, attaches the generated effective flag information to the time code, and then, outputs it to the second switch 28B.

The switch unit 28 (including the first switch 28A and the second switch 28B) selects the magnetic recording signal and the time code (including the effective flag information), and then, outputs them to the magnetic recording signal processor 40 in the recorder 22 during normal picking-up. The magnetic recording signal processor 40 mixes an output signal from the first switch 28A with an output signal from the second switch 28B in accordance with a predetermined recording format, and then, records the mixed data on the magnetic tape A via the magnetic head 41. Moreover, the magnetic recording signal processor 40 outputs the mixed data to the outside via the transmitter 42.

Basic operation of the above-described digital camera integral type VTR 20 is explained in more detail in reference to timing charts illustrated in FIGS. 13A to 13G. FIGS. 13A to 13G illustrate the timing charts in carrying out the frame rate conversion of 2-3 pull-down. The frame rate conversion of 2-3 pull-down signifies frame rate conversion in which a 24 P video signal picked up at a frame rate of 24 frames/second is converted into a frame rate of 60 frames/second, thereby generating a 60 P video signal.

FIG. 13A illustrates the reading starting signal in the CCD 24, to be transmitted from the timing signal generator 26 to the CCD 24; FIG. 13B illustrates a light accumulating time in the CCD 24; FIG. 13C illustrates the P video signal read from the CCD 24; FIG. 13D illustrates the synchronizing reference signal to be supplied from the timing signal generator 26 to the video signal processor 25; FIG. 13E illustrates the 60 P video signal generated after the frame rate conversion in the video signal processor 25; FIG. 13F illustrates the effective frame pulse signal for use in attaching the effective flag information to the P video signal read from the CCD 24; and FIG. 13G illustrates a recording pattern of the video signal to be recorded on the magnetic tape A.

The frame data arranged in an odd numbered position from the reference value of the time code in the P video signal before the frame rate conversion is arranged by repetition of two frames in the P video signal after the frame rate conversion. This frame data arrangement corresponds to frames marked with A and C in FIG. 13G. The frame data arranged in an even numbered position from the reference value of the time code in the P video signal before the frame rate conversion is arranged by repetition of three frames in the P video signal after the frame rate conversion. This frame data arrangement corresponds to frames marked with B in FIG. 13G. The effective flag information is recorded in accordance with the frame data located at the heading position in the frame data arranged redundantly in the P video signal after the frame rate conversion.

While the above-described basic picking-up operation of the digital camera integral type VTR 20 is carried out, the operator turns on the operating switch 29, as required. Then, the operating switch 29 outputs the ON operation signal to the switch unit 28 (including the first switch 28A and the second switch 28B).

Upon receipt of the ON operation signal, the first switch 28A selects the color bar signal (which is generated by the color bar generator 27) in place of the recording video signal (which is the P video signal after the frame rate conversion and is generated by the video signal processor 25), and then, outputs it to the magnetic recording signal processor 40. In the meantime, upon receipt of the ON operation signal, the second switch 28B selects the user information (which is generated by the user information setter 33) in place of the effective flag information (which is generated by the flag signal generator 32), and then, outputs it to the magnetic recording signal processor 40.

The magnetic recording signal processor 40 mixes the signal output from the first switch 28A and the signal output from the second switch 28B in accordance with a predetermined recording format, and then, records the mixed data on the magnetic tape A via the magnetic head 41. Moreover, the magnetic recording signal processor 40 outputs the mixed data to the outside via the transmitter 42.

With the above-described configuration, the picking-up operation and the recording operation are performed based on the picking-up frame rate and the recording frame rate set in the frame rate setter 31 at the time of the picking-up. At this time, the recording signal is recorded on the magnetic tape A in the state in which the effective flag information is stored at the user's bit area of the time code.

In contrast, when the operating switch 29 is turned on, the color bar signal and the user information are recorded on the magnetic tape A.

Incidentally, in reproducing the recording region of the magnetic tape A having the color bar signal and the like recorded therein, a reproducer is preferably configured as described below. That is to say, it is judged whether or not the user information is recorded at the user's bit area of the time code when the color bar signal is recorded, and thus, the reproducer is preferably configured such that the user information should be reproduced.

As described above, in the digital camera integral type VTR 20 in the present embodiment, the color bar signal or the user information can be recorded, as required, while the effective flag information is recorded at the user's bit area. In other words, the user can freely use the user's bit area. This is for the following reason: a period when a specific image generating signal such as the color bar signal is output signifies a period when the frame rate conversion is not carried out, and therefore, during this period, it is unnecessary to output the information on the frame rate conversion. Consequently, the user information can be output without any interruption of the information on the frame rate conversion by outputting the user information during the above-described period.

Although the color bar generator 27 for outputting the color bar signal has exemplified a specific image generator in the above-described sixth embodiment, the specific image signal is not limited to the color bar signal, and may include a test image which can be arbitrarily recorded.

The present invention is not limited to the particular embodiments given above, and various modifications and applications can be conceived.

(1) Although the pickup apparatus has been exemplified in the camera integral type VTR in the above-described embodiments, it may be exemplified in a digital camera.

(2) Although the pickup apparatus has been exemplified in the pickup apparatus, in which the signal is recorded at the user's bit area, in the above-described embodiments, it is not limited to this. For example, a special recording region may be provided in an AUX data region.

(3) Although the recording medium has been exemplified in the magnetic tape in the above-described embodiments, it is not limited to the magnetic tape, and may include an optical recording medium such as an optical disk. The magnetic recording medium may include a magnetic disk. Otherwise, the recording medium may include a recording medium constituted of a semiconductor recording device.

(4) Although the various pieces of information output from the pickup have been recorded on the recording medium in the above-described embodiments, only one kind of information may be recorded or the plurality of kinds of information may be recorded in an arbitrary combination out of the various pieces of information to be recorded.

(5) Although the progressive video signal (i.e., the P video signal) has been generated as the video signal in the pickup apparatus in the above-described embodiments, the present invention can be applied to a pickup apparatus, in which an interlace video signal is generated, in the same manner.

INDUSTRIAL APPLICABILITY

As described above, according to the present invention, the information on the frame rate conversion is output, and therefore, the information can be effectively used.

Furthermore, the position or the like of the frame data on the video signal before the frame rate conversion can be grasped with high accuracy in the video signal after the frame rate conversion. In particular, if the display is provided, the data can be readily grasped by visually observing the display.

Moreover, the user information and the like can be freely output together with the information on the frame rate conversion. In addition, the user information and the like can be output without any interruption of the information on the frame rate conversion.

The invention claimed is:
1. A video pickup apparatus comprising:
a pickup for generating a first video signal at a first frame rate, the first video signal comprising a sequence of progressive frames;
a frame rate converter which receives the first video signal and outputs a second video signal at a second frame rate, the second frame rate being the same or greater than the first frame rate, and the second video signal comprising a sequence of progressive frames;

a flag signal generator, which generates a single pulse for each of the plurality of frames in the first video signal, corresponding to a frame of the second video signal;

a counter, which outputs a value which is incremented by one in response to each pulse generated by the flag signal generator;

a recorder, which records a plurality of frames of the second video signal, each frame being recorded in association with the first frame rate and the value of the counter corresponding to each frame.

2. A video pickup apparatus as claimed in claim 1, further comprising a frame rate conversion information output unit that outputs information specifying a pickup starting time and a pickup ending time in the pickup as the information on the frame rate conversion.

3. A video pickup apparatus as claimed in claim 2, wherein the frame rate conversion information output unit outputs the information specifying the pickup starting time and the pickup ending time with a delay of a predetermined period of time from an actual pickup starting time and an actual pickup ending time.

4. A video pickup apparatus as claimed in claim 1, wherein the second frame rate is greater than the first frame rate.

* * * * *